United States Patent
Seiver et al.

(10) Patent No.: US 11,604,812 B2
(45) Date of Patent: Mar. 14, 2023

(54) SYSTEMS AND METHODS FOR INDEXING AND AGGREGATING DATA RECORDS

(71) Applicant: Palantir Technologies Inc., Denver, CO (US)

(72) Inventors: Miles Seiver, Los Altos Hills, CA (US); Lucas Lemanowicz, New York, NY (US)

(73) Assignee: Palantir Technologies Inc., Denver, CO (US)

( * ) Notice: Subject to any disclaimer, the term of this patent is extended or adjusted under 35 U.S.C. 154(b) by 100 days.

(21) Appl. No.: 17/149,535

(22) Filed: Jan. 14, 2021

(65) Prior Publication Data

US 2021/0133214 A1 May 6, 2021

Related U.S. Application Data

(63) Continuation of application No. 15/901,692, filed on Feb. 21, 2018, now Pat. No. 10,922,336, which is a
(Continued)

(51) Int. Cl.
| | |
|---|---|
| *G06F 16/00* | (2019.01) |
| *G06F 16/28* | (2019.01) |
| *G06F 16/22* | (2019.01) |
| *G06F 16/17* | (2019.01) |
| *G06F 16/2455* | (2019.01) |

(Continued)

(52) U.S. Cl.
CPC ........... *G06F 16/285* (2019.01); *G06F 16/00* (2019.01); *G06F 16/1734* (2019.01); *G06F 16/22* (2019.01); *G06F 16/2228* (2019.01); *G06F 16/244* (2019.01); *G06F 16/24556* (2019.01);
(Continued)

(58) Field of Classification Search
CPC .... G06F 16/285; G06F 16/00; G06F 16/1734; G06F 16/22; G06F 16/2228; G06F 16/244; G06F 16/24556; G06F 17/40; H04L 43/00; H04L 67/56
See application file for complete search history.

(56) References Cited

U.S. PATENT DOCUMENTS

| | | | |
|---|---|---|---|
| 8,930,331 B2 * | 1/2015 | McGrew | ............. G06F 16/1873 707/695 |
| 9,384,203 B1 | 7/2016 | Seiver et al. | |

(Continued)

OTHER PUBLICATIONS

Official Communication for European Patent Application No. 19175557.8 dated Sep. 25, 2020, 3 pages.

*Primary Examiner* — Noosha Arjomandi
(74) *Attorney, Agent, or Firm* — Knobbe, Martens, Olson & Bear, LLP

(57) ABSTRACT

Computer-implemented systems and methods are disclosed for indexing and aggregating proxy server data. In accordance with some embodiments, the systems comprise a memory device configured to store a set of instructions, and one or more processors configured to execute the set of instructions to receive a plurality of log lines of proxy server data comprising a plurality of data components and index one or more of the plurality of data components for the plurality of log lines. The processors also generate a plurality of log data records, each including the one or more indexed data components, and generate a summarized data record by aggregating one or more log data records having at least one matching indexed data component.

19 Claims, 11 Drawing Sheets

Related U.S. Application Data continuation of application No. 15/201,282, filed on Jul. 1, 2016, now Pat. No. 9,922,113, which is a continuation of application No. 14/734,772, filed on Jun. 9, 2015, now Pat. No. 9,384,203.

(51) Int. Cl.
*G06F 17/40* (2006.01)
*H04L 43/00* (2022.01)
*G06F 16/242* (2019.01)
*H04L 67/56* (2022.01)

(52) U.S. Cl.
CPC .............. *G06F 17/40* (2013.01); *H04L 43/00* (2013.01); *H04L 67/56* (2022.05)

(56) References Cited

U.S. PATENT DOCUMENTS

| | | |
|---|---|---|
| 9,922,113 B2 | 3/2018 | Seiver et al. |
| 10,922,336 B2 | 2/2021 | Seiver et al. |
| 11,360,950 B2* | 6/2022 | Harrison ............... G06F 16/254 |
| 2014/0032617 A1* | 1/2014 | Stanfill .................. G06F 16/25 |
| | | 707/809 |
| 2021/0133214 A1* | 5/2021 | Seiver ................. G06F 16/1734 |
| 2022/0164364 A1* | 5/2022 | Funk ..................... G06F 16/248 |

* cited by examiner

Level 1:

| Field | Description | |
|---|---|---|
| date | GMT Date in YYYY-MM-DD format. | Date of the request |
| c-ip | IP address of the client. | IP of host making the request |
| sc-status | Protocol status code from appliance to client. | HTTP Status Code (200, 307, 403, 500) |
| cs-method | Request method used from client to appliance. | Type of request (GET, POST, CONNECT) |
| cs-host | Hostname from the client's request URL. If URL rewrite policies are used, this field's value is derived from the "log" URL. See x-s-log-uri-host. | Hostname (FQDN(from the request)) |
| cs-uri-port | Port from the "log" URL. | Destination network port requested |
| r-ip | remote IP address | Destination IP |
| sc-filter category | Content filtering category of the request URL. | Proxy category |
| s-ip | IP address of the source. | |
| COUNT | Hit count – connections requested to that destination for that date in that logging period. | |

FIG. 7

Level 2:

| Field | Description | |
|---|---|---|
| date | GMT Date in YYYY-MM-DD format. | Date of the request |
| cs-method | Request method used from client to appliance. | Type of request (GET, POST, CONNECT) |
| cs-host | Hostname from the client's request URL. If URL rewrite policies are used, this field's value is derived from the "log" URL. See x-s-log-uri-host. | |
| r-ip | remote IP address | Destination IP |
| COUNT | Hit count – connections requested to that destination for that date in that logging period. | |

FIG. 8

Level 3:

| Field | Description | |
|---|---|---|
| sc-status | Protocol status code from appliance to client. | HTTP Status Code (200, 307, 403, 500) |
| r-ip | remote IP address | Destination IP |
| COUNT | Hit count – connections requested to that destination for that date in that logging period. | |

FIG. 9

SYSTEMS AND METHODS FOR INDEXING AND AGGREGATING DATA RECORDS

INCORPORATION BY REFERENCE TO ANY PRIORITY APPLICATIONS

This application is a continuation of U.S. patent application Ser. No. 15/901,692, filed Feb. 21, 2018, which application is a continuation of U.S. patent application Ser. No. 15/201,282, filed Jul. 1, 2016, which application is a continuation of U.S. patent application Ser. No. 14/734,772, filed Jun. 9, 2015, the contents of which are expressly incorporated herein by reference in their entireties. Any and all applications for which a foreign or domestic priority claim is identified in the Application Data Sheet as filed with the present application are hereby incorporated by reference under 37 CFR 1.57.

BACKGROUND

Networked systems continue to grow in size and complexity as the number of networked devices and users of these devices increase. Communications over these networked systems generate massive amounts of data that may be useful for a variety of different purposes. Use of such data, however, requires the ability to store the data, and, in some cases, the data must be stored for extended periods of time. But, for many enterprises, it is not feasible to store the increasingly large amounts of data, as storage of such data may require tens, if not hundreds, of servers or more. Additionally, as the amount of data increases, the difficulty in effectively using the data for a desired purpose may also increase.

One such data source includes proxy server data. While proxy server data may be beneficial for an enterprise to capture and evaluate, it can also generate extremely large amounts of data requiring very large storage repositories. The proxy server data may generally include a log of any traffic into and out of a dedicated network. Such proxy server data may be useful for evaluating overall network traffic, as well as identifying specific user communications and potentially harmful traffic on the dedicated network.

In some cases, proxy server log data for a single day may include over 725 million log lines. To store such data for one month could require over 38 terabytes of storage space, which may require almost 6.5 servers, each configured with 6 terabytes of storage space. To store that much data for an entire year would require almost 80 servers. And, those servers are just for proxy server log data. Thus, for many enterprises it is not practicable to store such historical records of proxy server log data, despite the fact that this data may include valuable information.

Moreover, for many enterprises desiring to store historical data records of such magnitude, the time to search the raw proxy server log records for useful information could require impractically long search times (e.g., upwards of one week in some instances) to return a beneficial result. For cybersecurity applications that require real-time results to minimize or prevent the effects of an attack, for example, such a delay required for searching the log data is unacceptable.

The above challenges are not limited to proxy server data. Similar challenges arise with respect to maintaining historical records of firewall data and other network data including e-mail metadata, as well as general information system data such as Active Directory™ data. Any system for storing or maintaining increasingly large amounts of historical data must confront the challenges and costs associated with maintaining such data.

Thus, there is a need for new systems and methods to address the specific storage and analytical requirements for effectively managing large amounts of data, including proxy server data. Additionally, new systems are needed for improving the usefulness of large data records.

BRIEF DESCRIPTION OF THE DRAWINGS

Reference will now be made to the accompanying drawings, which illustrate exemplary embodiments of the present disclosure and in which:

FIG. 7 is an illustration describing certain indexed data components of a level 1 index, consistent with embodiments of the present disclosure.

FIG. 8 is an illustration describing certain indexed data components of a level 2 index, consistent with embodiments of the present disclosure.

FIG. 9 is an illustration describing certain indexed data components of a level 3 index, consistent with embodiments of the present disclosure.

DETAILED DESCRIPTION OF THE EXEMPLARY EMBODIMENT

Figure 1:
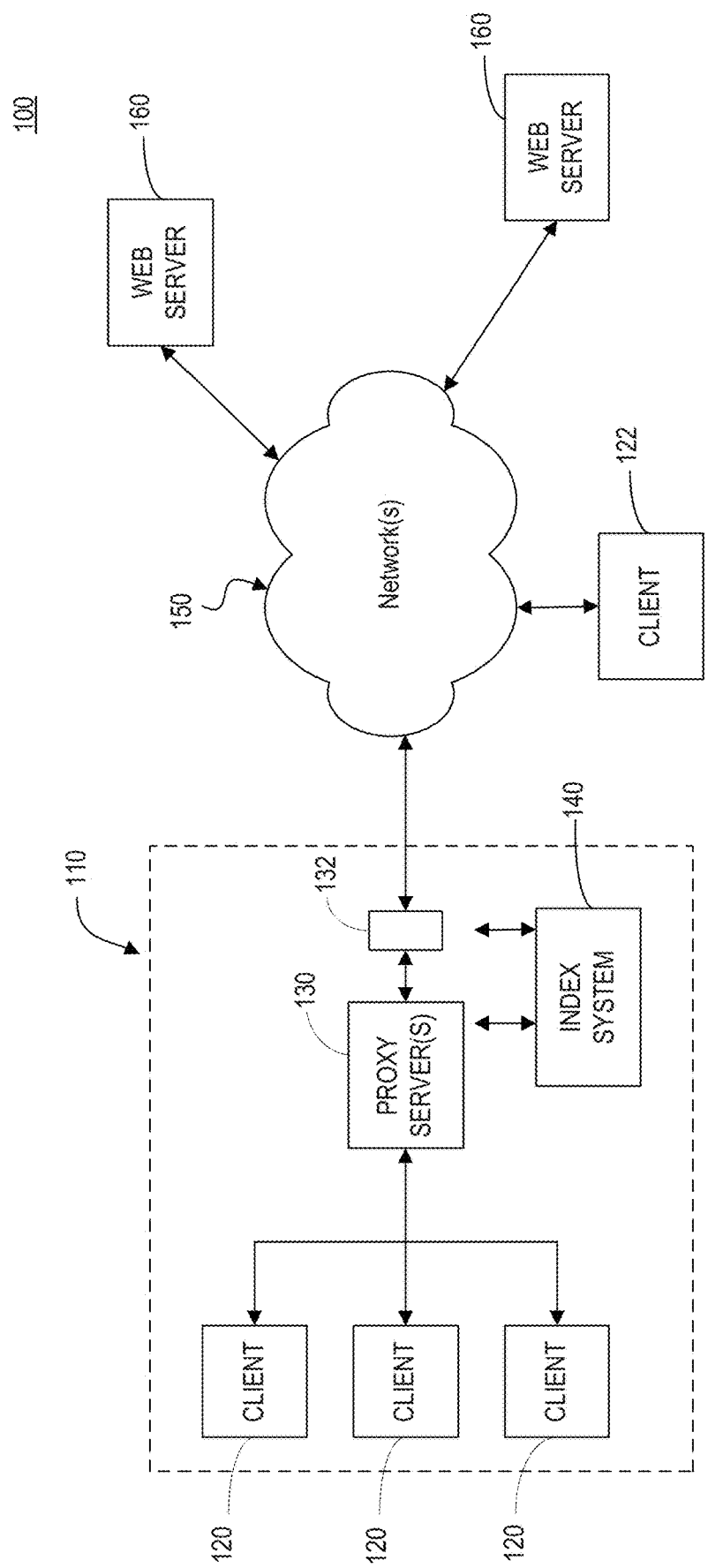
FIG. 1 is a block diagram of an exemplary system for indexing and aggregating a plurality of data records, consistent with embodiments of the present disclosure.

Reference will now be made in detail to exemplary embodiments, the examples of which are illustrated in the accompanying drawings. Whenever possible, the same reference numbers will be used throughout the drawings to refer to the same or like parts.

The embodiments described herein relate to methods, systems, and non-transitory computer-readable media for indexing and aggregating large volumes of data records, and thereby reducing the total storage space required for storing historical sets of such data records. The aggregation techniques of the disclosed methods and systems are capable of realizing the reduced storage requirements while maintaining historical significance and usefulness of the aggregated data records.

In some embodiments, a plurality of data items may be indexed according to any number of desired fields corresponding to data components contained within the data items. The indexed data items may be stored as a plurality of data records in any known manner and may be included as a chronological or other ordered set of records. According to this embodiment, the plurality of records may be aggregated according to any one or more of the indexed data components. Thus, certain individual data records of the plurality of data records with indexed data components matching one or more data components of other data records may be consolidated into a single summarized data record. The summarized data record includes at least the same matching indexed data components of the individual data records and may include an additional data component based on the aggregation.

In the disclosed embodiments, the aggregation may be performed dynamically or over any subset of the plurality of records based on a period of time or other factor. In some embodiments, aggregation may be performed according to one or more levels. In other words, a first level of aggregation may aggregate data records based on a first subset of data components, and a second level of aggregation may aggregate data records based on a second subset of data components. The first and second levels of aggregation may be performed based on the passage of time.

One particular embodiment describes the indexing and aggregation of proxy server data. Proxy server data of the disclosed embodiments may include any data generated by one or more proxy servers according to any known configuration or operation of the one or more proxy servers. The proxy server data generally includes a plurality of log lines of data representing distinct requests processed by a proxy server. The plurality of log lines may include a plurality of data components. In some embodiments, the plurality of log lines of proxy server data may be indexed according to one or more of the plurality of data components, generating a plurality of log data records. The plurality of log data records may then be aggregated by comparing one or more of the indexed data components and consolidating individual data records with matching components. For example, in some embodiments, the log data records may include at least an indexed client IP address field and a remote IP address field. In this embodiment, those log records with both a matching client IP address and a remote IP address may be consolidated into a single summarized log record. The summarized log record may include a new data field corresponding to the number of consolidated records or other aggregated data, such as a sum of the number of bytes transferred in the consolidated records.

The disclosed indexing and aggregation methods and systems may realize reductions in storage space by orders of magnitude in comparison to the conventional storage of historical log lines of proxy server data. The manner of aggregation of the disclosed embodiments may be configured according to any particular use of the underlying proxy server data. In other words, aggregation may be performed based on any one or more data components according to a particular implementation. Depending on the manner of aggregation, some example use cases have realized reductions in required storage capacity by over 98%. Such reductions in storage requirements may be realized due to certain redundancy identified in the nature of proxy server data.

For example, for any one client IP address generating a number of proxy server requests within a single day, proxy server data will include a log line for each request. Each log line corresponding to that client IP address may include data of a plurality of data components, the combination of which is unique in itself. However, depending on a desired use for the historical proxy server data, it may not be beneficial or necessary to store each of the unique log lines of proxy server data. Rather, in some embodiments, only those data components providing information relevant to certain inquiries for which an enterprise may desire an answer may need to be maintained.

While reducing the number of stored data components for each log line may be beneficial, considerable storage savings may be realized by aggregating the data records when matching data components are identified. Proxy server data may include considerable similarity between individual log data records due to the redundancy of certain proxy server requests. By aggregating and consolidating data records with certain matching data components to eliminate at least some of the redundancy, the disclosed aggregation methods greatly reduce the total number of log data records stored. Particular examples are described in greater detail below.

The disclosed indexing and aggregation methods and systems additionally may improve the analytical capability and speed at which the historical data records may be analyzed for particular analysis. Aggregated data may require searching of fewer log data records, and the manner of aggregating matching log records based on particular data components may enable improved analytical capabilities at speeds unmatched by conventional systems. The disclosed methods and systems also include an interface configured for displaying certain exemplary analytical capabilities based on the disclosed indexing and aggregation methods.

The disclosed methods and systems may be useful not only for aggregating, storing, and searching proxy server data, but may also be useful for other types of data sets. In some embodiments, the data set may include a plurality of firewall log lines, and in another embodiment, indexing and aggregation may be performed for the combined data set of firewall and proxy server data. Other embodiments may use data sets generated by intrusion detection systems or other cybersecurity applications. In some embodiments, the data records may include general network data generated from any network device. The data records may also include e-mail data records including e-mail metadata for example. Additionally, the disclosed methods and systems may be suitable for analyzing financial transaction data or health records, or any other information system data, including directory data or other database data. Any application dealing with large volumes of data sets in which individual data records and the data components included therein include some overlap or redundancy may benefit from the disclosed indexing and aggregation methods.

The following disclosure provides exemplary systems and methods for indexing and aggregating data records capable of realizing the above advantages and benefits over conventional systems.

FIG. 1 is a block diagram of an exemplary system 100 for indexing and aggregating data records, consistent with embodiments of the present disclosure. As shown, system 100 includes a plurality of computing systems interconnected with one or more networks. A first network 110 may be configured as a dedicated enterprise specific network. The first network 110 may include a plurality of client devices 120, one or more proxy servers 130, a firewall 132, and an index system 140. The first network 110 may be capable of communicating with one or more web servers 160 and other client devices 122 via one or more additional networks 150.

Networks 110 and 150 may comprise any type of computer networking arrangement used to exchange data among a plurality of computing components and systems. Network 110 may include a single local area network, or a plurality of distributed interconnected networks and may be associated with an enterprise or organization. The interconnected computing systems of network 110 may be within a single building, for example, or distributed throughout the United States and globally. Network 110, thus, may include one or more private data networks, a virtual private network using a public network, one or more LANs or WANs, and/or any other suitable combination of one or more types of networks, secured or unsecured.

Network(s) 150, likewise may comprise any type of computer networking arrangement for facilitating communication between the first network 110 and other distributed computing components such as web servers 160 or other client devices 122. Web servers 160 may include any configuration of one or more servers or server systems interconnected with network 150 for facilitating communications and transmission of content or other data to the plurality of computing systems interconnected via network 150. Network 150 may include the Internet, a private data network, a virtual private network using a public network, a Wi-Fi network, a LAN or WAN network, and/or other suitable connections that may enable information exchange among various components of system 100. Network 150 may also include a public switched telephone network ("PSTN") and/or a wireless cellular network.

Client devices 120 and 122 may include any type of computing system configured for communicating within network 110 and/or network 150. Client devices 120, 122 may include, for example, a desktop computer, laptop computer, tablet, smartphone and any other network connected device such as a server, server system, printer, as well as other networking components.

Proxy server 130 may include one or more proxy servers. As this termed is used throughout the specification, proxy server 130 may refer to any type of computing component or system for handling communication requests between one or more interconnected computing devices of network 110. In some embodiments, proxy server 130 may include a proxy server system including one or more computing components each handling distinct communication requests. The one or more computing components may be configured according to any desired configuration of network 110. In some embodiments, proxy server 130 may include a plurality of proxy server systems distributed throughout first network 110 based on the configuration of network 110. In some embodiments, proxy server 130 may be configured as one or more edge servers positioned between a private network of first network 110, for example, and public network 150. According to this embodiment, proxy server 130 may be configured to generate log data relating to the plurality of communication requests for communications leaving and entering first network 110.

First network 110 may also include one or more firewalls 132, implemented according to any known firewall configuration for controlling communication traffic between first network 110 and network 150. In some embodiments, firewall 132 may include an edge firewall configured to filter communications entering and leaving first network 110. In some embodiments, firewall 132 may be configured to generate log data corresponding to the monitored traffic between first network 110 and network 150. Firewall 132 may be positioned between proxy server 130 and network 150. In the embodiment shown, firewall 132 and proxy server 130 are positioned within first network 110, however, other configurations of network 110 are contemplated by the present disclosure. For example, in another embodiment, one or more of the proxy server 130 and firewall 132 may be provided external to the first network 110. Any other suitable arrangement is also contemplated. Additionally, other networking components, not shown, may be implemented as part of first network 110 or external to network 110 for facilitating communications within the first network 110 and with other external networks such as network 150.

First network 110 may also include an index system 140 configured to perform the indexing and aggregation methods of the present disclosure. Index system 140 may be connected to proxy server 130 and firewall 132 to receive the plurality of log data generated by proxy server 130 and/or firewall 132. An exemplary configuration of index system 140 is shown with respect to FIG. 2.

Figure 2:
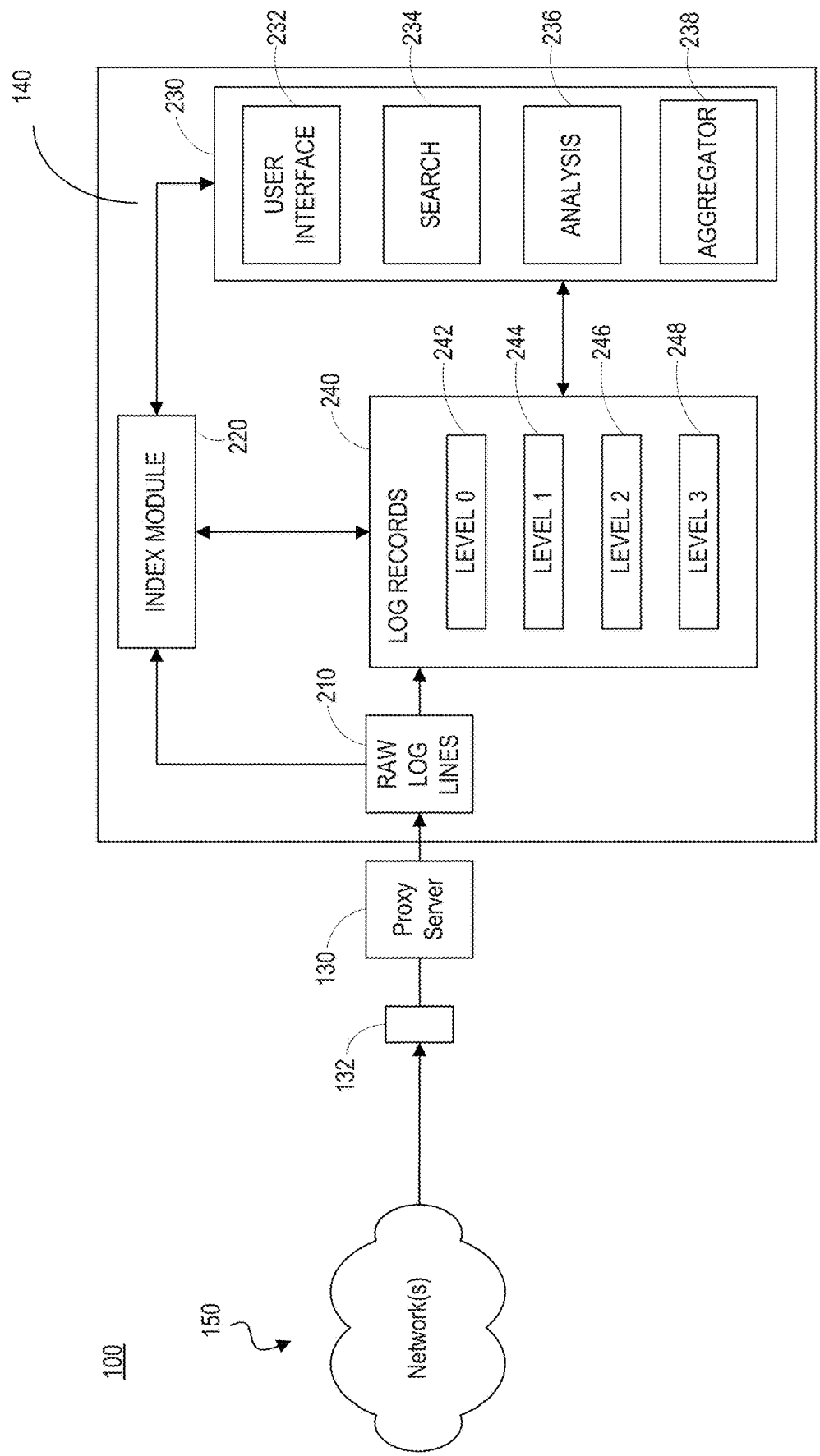
FIG. 2 is a block diagram of an exemplary index system, consistent with embodiments of the present disclosure.

As shown in FIG. 2, index system 140 according to an exemplary embodiment may include a plurality of hardware components and software components or modules providing instructions for performing the disclosed functions. As shown, index system 140 may include a raw log lines module 210, an index module 220, a manager module 230 and a log records storage system 240. Manager module 230 may include additional data processing modules providing particular functionality, such as a user interface module 232, a search module 234, an analysis module 236 and an aggregator module 238. Throughout this disclosure, the one or more "modules" may include logic embodied in hardware or firmware, or a collection of software instructions, as well as a dedicated processing device and a memory for storing the collection of software instructions.

Log records storage system 240 may include a plurality of log data records indexed and aggregated according to one or more levels as disclosed in greater detail below. Log records storage system 240 may include a plurality of storage components for storing raw log line data ("level 0" index), as well as other indexed log data records according to one or more index levels. For example, log records storage system 240 may separately store log data records in dedicated storage compartments according to their indexed level, such as "level 0" index compartment 242, "level 1" index compartment 244, "level 2" index compartment 246 and "level 3" index compartment 248. Alternatively, the indexed log data records may be stored in any suitable manner. Log records storage system 240 may include one or more summarized log records associated with the indexed log records. The one or more summarized log records may include an aggregation of one or more log records with matching indexed data components according to the indexed level of the associated log records. The storage components of log records storage system 240 may include any known storage components including one or more hard drives, server systems, database systems, or any combination and configuration of known storage components. In some embodiments, log records storage system 240 may be provided as external and/or distributed storage components otherwise accessible to index system 140.

In some embodiments, raw log lines module 210 of index system 140 may comprise a module configured to receive raw log lines of data. The raw logs of data may include raw log lines of proxy server data and/or firewall data corresponding to a plurality of communication requests and other traffic passed between first network 110 and network 150. The raw log lines of data may include a plurality of data components corresponding to communication requests processed by proxy server 130 and/or firewall 132, for example. The number and type of data components may vary depending on the functionality and configuration of proxy server 130 and firewall 132. Exemplary data components contained within a log line of proxy server data are described below with respect to FIG. 7.

In some embodiments, the raw log lines may be received as one or more data files containing the log data generated by proxy server 130 and/or firewall 132. In some embodiments, the raw log lines may correspond to communication requests handled for a single day, but any other metric may be used, such as by the hour, or by the week, for example. The one or more data files may be configured according to any known format and may include both structured and unstructured data. In another embodiment, raw log lines module 210 may be configured to receive raw log lines of proxy data as it is generated by proxy server 130 and/or firewall 132. In other embodiments, the raw log lines may be received periodically, or upon request.

Index module 220 of index system 140 may be configured to index the raw log lines of data according to a plurality of data components included in the raw data. In some embodiments, index module 220 may access the raw data directly from raw log lines module 210, whereas in other embodiments, index module 220 may receive the raw log lines from log records storage system 240. Index module 220 may be configured to index all data components contained within a log line of data, or alternatively index module 220 may be configured to index only certain data components within a received log line. Index module 220 may be configured to generate a plurality of log data records, each including one or more indexed data components. Index module 220 may be controlled by a manager module 230 to perform indexing according to any desired configuration. Index module 220 may be configured to return the indexed log data records to log records storage system 240.

Manager module 230 of index system 140 may include a plurality of data processing modules, such as a user interface module 232, a search module 234, an analysis module 236 and an aggregator module 238. A number of other data processing modules are also contemplated by the present disclosure. User interface module 232 may be configured to provide instructions for generating a user interface by displaying certain information related to the disclosed systems and methods. The displayed information may include search results processed according to search module 234 or analytical results processed according to analysis module 236. Search module 234 and analysis module 236 may be configured to interoperate with an aggregator module 238 that is configured to aggregate one more of the log data records received from index module 220 or log records storage system 240, according to the embodiments described below. Some exemplary interfaces depicting exemplary search and analytical functionality are described in greater detail below with respect to FIGS. 10 and 11.

Index system 140 may be implemented using various configurations of computer hardware components and software components. An exemplary special purpose computing system 300, for example, capable of implementing the functionality of index system 140 is described below with respect to FIG. 3. Other components of system 100, such as client devices 120, 122, as well as, proxy server 130, firewall 132 and web servers 160 may also be implemented in the exemplary computing system 300 described below.

Figure 3:
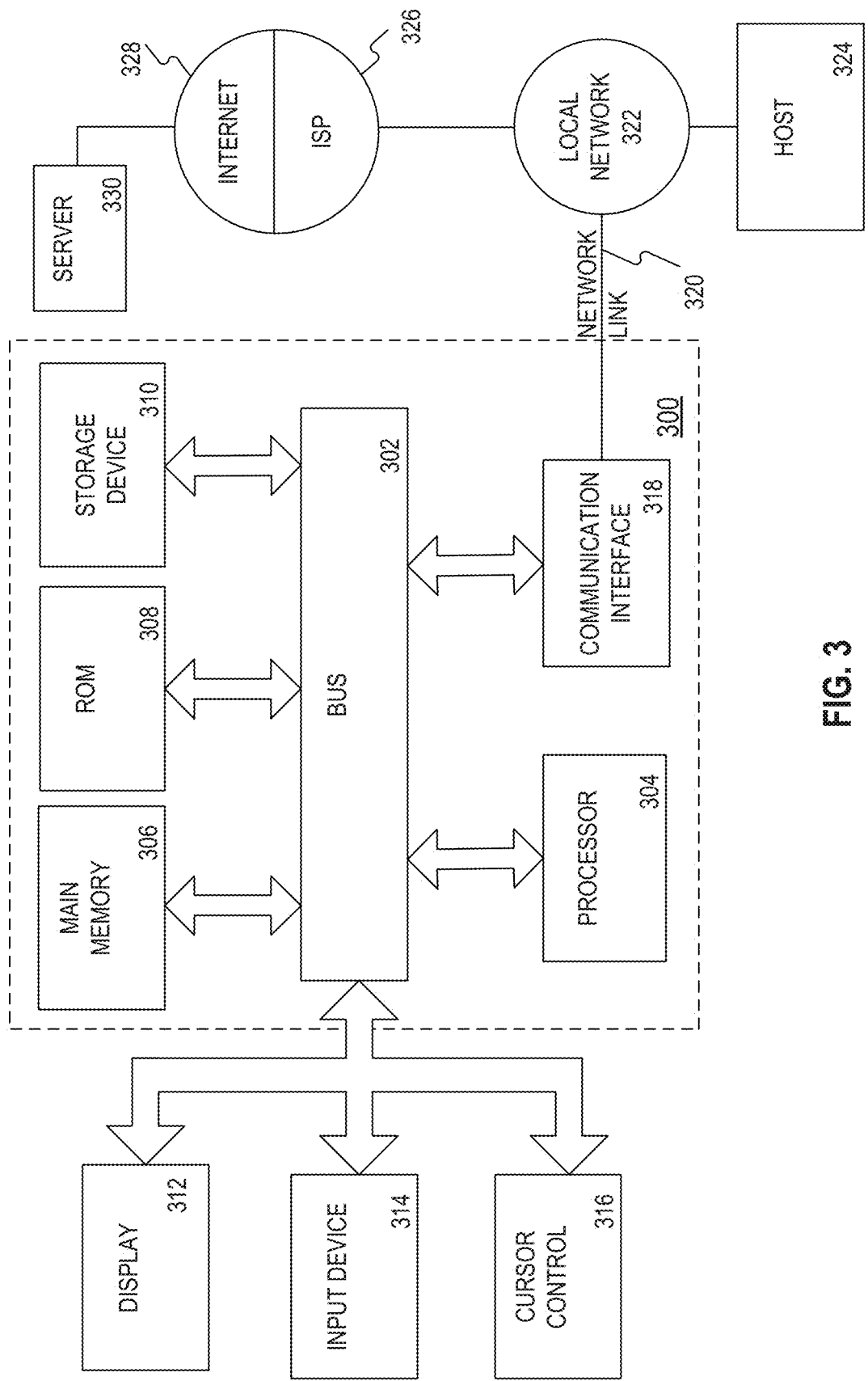
FIG. 3 is a block diagram of an exemplary computing system, consistent with embodiments of the present disclosure.

FIG. 3 is a block diagram of an exemplary computer system 300, consistent with embodiments of the present disclosure. As illustrated in FIG. 3, computer system 300 may include a bus 302 or other communication mechanism for communicating information, and one or more hardware processors 304 (denoted as processor 304 for purposes of simplicity) coupled with bus 302 for processing information. Hardware processor 304 can be, for example, one or more processors or microprocessors. Hardware processor 304 may include any suitable device for executing logic instructions, including, for example, microprocessors (e.g., those available from Intel, AMD, etc.), integrated circuits, logic gate arrays, etc. Hardware processor 304 may be dedicated to providing particular ones of the functions described herein, or it may perform other non-specific tasks as well.

Computer system 300 may also include a main memory 306, such as a random access memory (RAM) or other dynamic storage device, coupled to bus 302 for storing information and instructions to be executed by processor 304. Main memory 306 also can be used for storing temporary variables or other intermediate information during execution of instructions to be executed by processor 304. Such instructions, after being stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or USB thumb drive (Flash drive), etc. is provided and coupled to bus 302 for storing information and instructions.

Computer system 300 can be coupled via bus 302 to a display 312, such as a cathode ray tube (CRT), liquid crystal display, or touch screen, for displaying information to a computer user. An input device 314, including alphanumeric and other keys, may be coupled to bus 302 for communicating information and command selections to processor 304. Other types of user input devices may also be used, including a cursor control 316, such as a mouse, a trackball, or cursor direction keys for communicating direction information and command selections to processor 304 and for controlling cursor movement on display 312. The input device may include two degrees of freedom in two axes. For example, use of a first axis (for example, x) and a second axis (for example, y), may allow the device to specify positions in a plane. In some embodiments, the same direction information and command selections as cursor control can be implemented via receiving touches on a touch screen without a cursor.

Computing system 300 can include a user interface module (such as user interface module 232 shown in FIG. 2) to implement a graphical user interface that can be stored in a mass storage device as executable software codes that are executed by the one or more computing devices. This and other modules (such as search module 234, analysis module 236 and aggregator module 238) can include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module can be compiled and linked into an executable program, installed in a dynamic link library, or written in an interpreted programming language such as, for example, BASIC, Perl, or Python. It will be appreciated that software modules can be callable from other modules or from themselves, and/or can be invoked in response to detected events or interrupts. A module "configured to" perform a given function generally includes programming instructions that provide the described functions when executed by a processing device.

Software modules configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that can be combined with other modules or divided into sub-modules despite their physical organization or storage.

Computer system 300 can implement the techniques described herein using customized hard-wired logic, one or more ASICs or FPGAs, firmware and/or program logic which in combination with the computer system causes or programs computer system 300 to be a special-purpose machine. According to some embodiments, the operations, functionalities, and techniques and other features described herein are performed by computer system 300 in response to processor 304 executing one or more sequences of one or more instructions contained in main memory 306. Such instructions can be read into main memory 306 from another storage medium, such as storage device 310. Execution of the sequences of instructions contained in main memory 306 causes processor 304 to perform the process steps described herein. Hardware processor 304 may also be programmed directly with instructions (in its instruction set, for example) for accomplishing all or part of the disclosed process steps described herein. For example, the instruction of hardware processor 304 may include instructions developed and included specifically for performing one or more of the tasks associated with proxy server aggregation. In alternative embodiments, hard-wired circuitry can be used in place of or in combination with software instructions.

The term "non-transitory media" as used herein refers to any non-transitory media storing data and/or instructions that cause a machine to operate in a specific fashion. Such non-transitory media can comprise non-volatile media and/or volatile media. Non-volatile media can include, for example, optical or magnetic disks, such as storage device 310. Volatile media can include dynamic memory, such as main memory 306. Common forms of non-transitory media can include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from, but can be used in conjunction with, transmission media. Transmission media can participate in transferring information between storage media. For example, transmission media can include coaxial cables, copper wire and fiber optics, including the wires that comprise bus 302. Transmission media can also take the form of acoustic or light waves, such as those generated during radio-wave and infra-red data communications.

Various forms of media can be involved in providing one or more sequences of one or more instructions to processor 304 for execution. For example, the instructions can initially be provided on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 can optionally be stored on storage device 310 either before or after execution by processor 304.

Computer system 300 can also include a communication interface 318 coupled to bus 302. Communication interface 318 can provide a two-way data communication coupling to a network link 320 that can be connected to a local network 322. For example, communication interface 318 can be an integrated services digital network (ISDN) card, cable modem, satellite modem, or a modem to provide a data communication connection to a corresponding type of telephone line. As another example, communication interface 318 can be a local area network (LAN) card to provide a data communication connection to a compatible LAN. Wireless links can also be implemented. In any such implementation, communication interface 318 can send and receive electrical, electromagnetic or optical signals that carry digital data streams representing various types of information.

Network link 320 can typically provide data communication through one or more networks to other data devices. For example, network link 320 can provide a connection through local network 322 (which may correspond to first network 110) to a host computer 324 or to data equipment operated by an Internet Service Provider (ISP) 326. ISP 326 in turn can provide data communication services through the world wide packet data communication network now commonly referred to as the "Internet" 328 (which may correspond to network 150). Local network 322 and Internet 328 can both use electrical, electromagnetic or optical signals that carry digital data streams. The signals through the various networks and the signals on network link 320 and through communication interface 318, which carry the digital data to and from computer system 300, can be example forms of transmission media.

Computer system 300 can send messages and receive data, including program code, through the network(s), network link 320 and communication interface 318. In the Internet example, a server 330 can transmit a requested code for an application program through Internet 328, ISP 326, local network 322 and communication interface 318. The received code can be executed by processor 304 as it is received, and/or stored in storage device 310, or other non-volatile storage for later execution. In some embodiments, server 330 can provide information for being displayed on a display.

Figure 4:
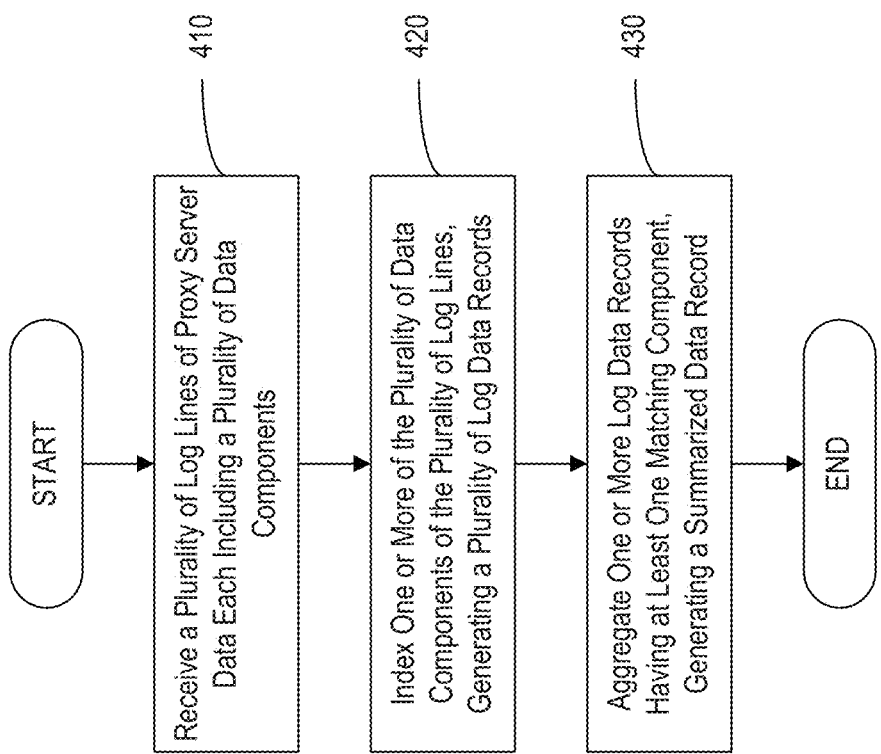
FIG. 4 is a flowchart representing an exemplary method for indexing and aggregating a plurality of data records, consistent with embodiments of the present disclosure.

The following sections include a detailed discussion of particular exemplary techniques and methods for indexing and aggregating data records as performed by index system 140. For example, FIG. 4 illustrates a flowchart of an exemplary indexing and aggregation process 400 according to a disclosed embodiment. Process 400 of FIG. 4 may be performed by one or more modules of index system 140, as shown and described with respect to FIG. 2. While the following disclosure relates to a particular embodiment of indexing and aggregating proxy server data, the following techniques and methods are not specifically limited to proxy server data and may be implemented using any suitable data source.

As shown in FIG. 4, as part of a first operation 410, index system 140 may receive a plurality of log lines of proxy server data. The proxy server data may be received by raw log lines module 210, and may be received in any form and format as may be generated by one or more proxy servers 130. The plurality of log lines may include a plurality of data components related to particular aspects of the plurality of communication requests received and handled by the one or more proxy servers 130. The one or more proxy servers 130 may be configured to generate log data including any number and type of data components related to the received requests. In some embodiments, one or more proxy servers 130 may be configured to handle communication and traffic requests over the Internet (network 150) in the form of HTTP or FTP requests (or any other suitable protocol). The generated log data may include any number of data components related to these requests.

In some embodiments, the plurality of data components for each of the logged HTTP requests may include, for example, a date of the received communication request, an IP address of the client making the request, an HTTP status code of the request, a type of the request, the hostname of the client's request, a destination network port of the request, the destination IP address of the request, a category of the request, an address of the proxy server handling the request, the number of bytes sent, and the number of bytes received, as well as any other additional data components related to the request.

The one or more proxy servers 130 may be configured to generate a log file including raw data corresponding to a plurality of log lines including the above data components for each of the handled communication requests. The one or more proxy servers 130 may be configured to generate proxy server data including certain particular data components in the received communication requests according to the desires of a particular enterprise. In some embodiments, the one or more proxy servers 130 may generate and store a log file according to a predetermined logging period. In some embodiments, the logging period may be over the course of one day. In another embodiment, the logging period may include the course of one hour, and in other embodiments, the logging period may include longer periods of time, such as one week or one month (or shorter or longer).

In some embodiments, the one or more proxy servers may be configured to transmit the generated log file to index system 140 at the end of each logging period. In other embodiments, the one or more proxy servers 130 may be configured to store the generated log file for an unspecified period of time and transmit the generated log file to index system 140 upon request. Alternatively, raw proxy server data may be transmitted to index system 140 automatically, as it is generated.

As part of operation 420, index system 140 may be configured to index one or more of the plurality of data components of the plurality of received log lines. The indexing operation of the disclosed embodiments may be performed according to index module 220. In some embodiments, index module 220 may index each of the plurality of log lines as the proxy server log data is received. Thus, index module 220 may index the raw log lines depending on the manner in which index system 140 receives or retrieves proxy server log data. For example, in some embodiments, index module 220 may index the plurality of raw log lines as it receives a log file from proxy server 130. In another embodiment, index module 220 may index individual log lines of data as they are automatically received from proxy server 130. In other embodiments, indexing operation 420 may be performed upon request by manager module 230, for example. Index module 220, in the disclosed embodiments, may be configured to generate a plurality of log data records, each corresponding to an indexed log line of proxy server data. The plurality of log data records may be stored by index system 140 in log records storage system 240.

The disclosed embodiments may also include dynamic indexing and aggregation of the plurality of log data records according to particular implementations desired by an enterprise associated with first network 110. For example, in some embodiments, the manner of indexing and aggregating the plurality of log data records may depend on the enterprise's purpose for storing proxy server data and any other questions or inquiries the enterprise may have concerning communications into and outside of its network 110.

In some embodiments, an enterprise may desire to monitor communications of particular individuals or monitor communications directed to or received from particular remote IP addresses or domains. One purpose of monitoring such communications may be as a cybersecurity defense or other measure. For example, an enterprise may desire to identify if a particular malicious domain or remote IP address has accessed its network 110. Such information may be desired over a historical time period. Additionally, other information corresponding to the particular communications associated with the identified malicious IP address or domain may also be desired, such as a date of such access, the number of bytes transmitted or received, the client IP address communicating with the domain, etc.

For these or other purposes, some enterprises may desire to maintain a historical log of proxy server data for periods of up to one year or more. As previously discussed, however, it may be infeasible for a particular enterprise to implement such a monitoring system due to the storage requirements for maintaining such a historical set of raw proxy server log data.

Some embodiments of the exemplary systems and methods implement a strategic, layered approach for maintaining historical records of proxy server log data that provides the enterprise with a historical perspective of the proxy server log data while considerably reducing the storage requirements for maintaining the historical sets of data.

According to some embodiments, index module 220 may be configured to index each of the plurality of data components included in the received raw log lines of proxy server data, and generate a plurality of log data records including the indexed data components. This manner of indexing corresponds to a "level 0" index of the disclosed embodiments. A "level 0" index in the disclosed embodiments may include each of the data components in the raw proxy server data. In some embodiments, the "level 0" indexed log data records may be stored in storage component 242 shown in FIG. 2.

Because the "level 0" indexed data records may include an immense number of data records, it may not be feasible to store such "level 0" indexed log data records for an extended period of time. Additionally, it may be unwieldy to search for particular information over the immense number of "level 0" data records.

Thus, to reduce the total number of log data records for storage and/or searching and analysis, index system 140, as part of operation 430, may aggregate one or more of the "level 0" log data records having at least one matching (or corresponding) indexed data component. As a result of the aggregation operation 430, index system 140 may generate one or more summarized data records. Aggregation operation 430 may be performed according to aggregator module 238 shown in FIG. 2. Performance of operation 430 may be understood in view of FIGS. 5 and 6.

Figure 6:
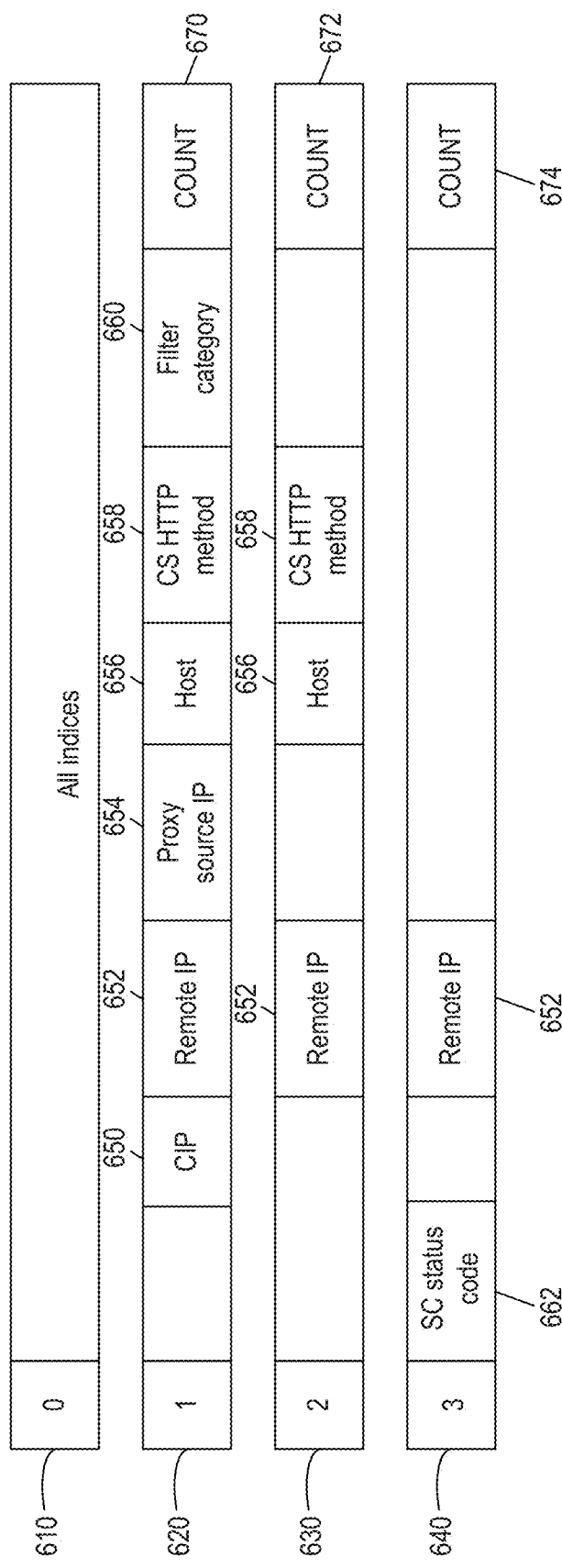
FIG. 6 is an illustration identifying exemplary levels of indexing, consistent with embodiments of the present disclosure.

As shown in FIG. 6, a single "level 0" log data record 610 may include a log data record of a plurality of indices corresponding to data components received in the raw proxy server log data file. In the disclosed embodiments, certain ones of the plurality of indices may provide particularly useful information for answering specific questions concerning communications into and out of an enterprise's network 110. Thus, some questions may be answered by looking at a subset of the data components. In any one embodiment, an enterprise can identify which subset of the data components may provide an answer to a particular inquiry. The identified subset of data components may comprise or define a "level 1" indexed log data record.

For example, according to an exemplary embodiment, a "level 1" indexed log data record may include less than all of the data components of the "level 0" indexed data record. In the embodiment shown in FIG. 6, such an exemplary "level 1" indexed log data record may include "CIP" field 650, a "Remote IP" field 652, a "Proxy source IP" field 654, a "Host" field 656, a "CS HTTP method" field 658, a "Filter Category" field 660 and a "Count" field 670. This combination of data components is provided by way of example only. Any other combination of greater or fewer data components may be selected for a "level 1" indexed log data record. Explanation of the particular fields is provided in FIG. 7.

As shown in FIG. 7, "CIP" field 650 may include an IP address of the client making the communication request. "Remote IP" field 652 may include the IP address of a remote destination of the communication request. "Proxy source IP" field 654 may include an IP address of the proxy server handling the request and generating the log data. "Host" field 656 may include the hostname or domain of the communication request. "CS HTTP method" field 658 may include the request method used in the communications request. "Filter Category" field 660 may include a content filtering category of the request. "Count" field 670 includes the data component based on the aggregation of the disclosed embodiments. As shown in FIG. 7, "Count" field 670 may include the number of connections requested for a destination in a logging period. "Count" field 670 may be based on other aspects of the aggregation depending on the manner of aggregation.

As part of operation 430, index system 140 may effectively compress the data stored in a "level 0" indexed log data record by eliminating certain ones of the plurality of data components of the "level 0" log data record. A first part of operation 430 may include generating a plurality of "level 1" log data records including only the selected data components. A second part of operation 430 may then aggregate those "level 1" log data records that have matching data components. A "match" in aggregation operation 430 may be based on an exact match of the compared data components or based on relational interpretations of the compared data components, such that certain non-exact matches may also result in aggregation.

Thus, according to some embodiments, aggregator module 238 of index system 140 may perform an operation to compare the "level 1" indexed data components of each of the "level 1" log data records to identify those log data records that have matching or corresponding data components. In this embodiment, those records for which each of the "level 1" indexed data components match may then be combined into a single summarized log data record. Each summarized log data record may include the same data components as the individual "level 1" log data records, thus potentially relevant information is maintained even after the aggregation.

Alternatively, a first part of operation 430 may include comparing a "level 0" log data record to a first "level 1" indexed log data record. And, if the relevant indexed data components match, then aggregating (a second part of operation 430) the first "level 0" log data record into the first "level 1" indexed log data record. If the relevant indexed data components do not match, then generating a second "unique" "level 0" log data record. This process may be iteratively performed for each subsequent "level 0" log data record.

In some embodiments, "level 1" indexing and aggregation may be performed directly and automatically on received log lines of data. Thus, in some embodiments, relevant data components of a received log line of data may be compared to other "level 1" indexed log data records to determine whether the received log line of data is "unique" with respect to the "level 1" indices. If the received log line of data is "unique," then the received log line of data may be indexed and stored as a "level 1" log data record. Alternatively, if relevant components of the received log line of data match a "level 1" log data record, the received log line of data may be aggregated with the matching "level 1" log data record creating a summarized log data record, and a data component based on the aggregation may be updated accordingly.

In some embodiments, the summarized log data record may include a new data component based on the aggregated data records. In the embodiment shown, the new data component corresponds to "count" field 670. In this embodiment, "count" field 670 may include an identifier directed to the number of records aggregated in the summarized record. In another embodiment, an additional data field may be added corresponding to a total number of bytes sent or a total number of bytes received for the aggregated records. In this manner, the additional data field may maintain a desired historical perspective of the aggregated data records.

Figure 5:
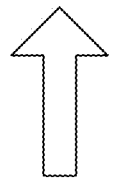
FIG. 5 is an illustration of a sample summary log record, consistent with embodiments of the present disclosure.

A simplified example of an aggregation process according to the disclosed embodiments is shown in FIG. 5. According to this example, a small sample set of log data records for a particular date is shown including a number of log data records identifying a particular domain ("google.com" or "yahoo.com"), an HTTP request type, and a client IP address. In this example, each of the log data records is unique, however, not all of the data components may be necessary to answer a particular question concerning the network traffic of an enterprise's network. In this example, an enterprise may be concerned as to whether a particular domain has accessed or serviced the network. Thus, according to an exemplary aggregation method, those data components directed to a domain and the type of HTTP request may be indexed and aggregated.

In this embodiment, each unique combination of data components will be represented in the aggregated summary. For example, 5 of the log records shown include matching data components of a "google.com" domain and GET request type. Thus, as part of the aggregation step, these 5 log records may be aggregated into a single log record as shown, with an additional data component indicating that 5 records were aggregated for that "unique" combination of data components. Additionally, a single log record appears for the "unique log" record with a "google.com" domain and PUT request type including a data component indicating that only 1 record included that combination, as well as a single log record for "yahoo.com" domain and GET request type including a data component indication that 2 records included that combination. Thus, as a result of the aggregation step, a fewer number of "unique" log data records remain. In this example, there are only three unique log data records based on the indexed domain and type of HTTP request.

In the example shown in FIG. 5, the total number of log data records was reduced from "8" to "3". As detailed above, in one test case, however, the total number of log data records in an exemplary "level 1" aggregation has been shown to be reduced by over 98%. The realized reduction in total log data records may depend on the particular indexed components selected for a "level 1" aggregation. For some cybersecurity applications, for example, an enterprise may be able to answer particular questions concerning the nature or existence of a threat based on a small subset of the plurality of data components included in a "level 0" indexed log data record. And for determining whether a particular domain has serviced or accessed the network, similar to the example discussed above with respect to FIG. 5, there may be considerable redundancy in the indexed data components. A significant portion of Internet traffic coming into and leaving an enterprise's network may be directed to a small number of common domains, such as "google.com," "yahoo.com," "youtube.com," "facebook.com," or any other commonly accessed domains. Only a very small relative number of communication requests handled by a proxy server 130 may include a unique domain data component.

For example, in the test case discussed above which analyzed over 727 million log lines of proxy server data for a single day, there were only a little more than 901,000 unique domains included in the 727 million log lines, representing about 0.12% of the total number of log lines. For this test case, an exemplary "level 1" aggregation, as shown in FIG. 6, resulted in a little more than 10 million unique "level 1" log data records, corresponding to around 1.38% of the "level 0" log data records. Thus, a "level 1" aggregation according to the disclosed embodiment resulted in a reduction of log data records of over 98%. In terms of storage requirements, the test case required about 6.6 servers to store "level 0" log data records for each day of a month, whereas only 0.09 servers were needed to store "level 1" log data records for each day of the month. Moreover, considerable time savings may also be realized for searching the significantly reduced number of total log data records, such that targeted results based on indexed data components may be received within seconds or less, whereas conventional systems searching raw proxy server data may take up to a week to return similar results.

Thus, by aggregating those log data records with matching domain data components (or other common components), for example, the total number of "unique" indexed log data records can be considerably reduced. But, even though the total number is reduced, the exemplary systems and methods still maintain some historical perspective by identifying an aggregated parameter based on the consolidated data records.

According to the disclosed embodiments, a "level 1" aggregation operation may be performed over any selected or predetermined logging period. Thus, some embodiments may aggregate log data records for a particular date, a plurality of dates, or a smaller segment of time such as over an "hour." Thus, a summarized log record according to the exemplary embodiments may provide an analytical component based on any desired period of time. For example, for a "level 1" aggregation performed over a single day of proxy server log data, the exemplary embodiments may generate a summarized log data record identifying the total number of unique "level 1" data records for a single day. Thus, over time, the historical data set of proxy server log data may be categorized by date, or any other factor. Additionally, in some embodiments, a "level 1" (or other level) aggregation may be performed continuously for any given period of time, on the fly, aggregating log lines of data as they are received by the index system 140.

According to the disclosed embodiments, additional levels of aggregation may be performed separate from or in conjunction with "level 1" aggregation, and may also be performed in lieu of a "level 1" aggregation. For example, as shown in FIG. 6, an exemplary embodiment may include a "level 2" aggregation and/or a "level 3" aggregation. One or more of the further levels of aggregation may be performed on subsets of the lower index level log data records. For example, as shown in FIG. 6, a "level 2" indexing and aggregation may be performed on the "Remote IP" field 652, "Host" field 656 and "CS HTTP method" field 658, as shown with respect to "level 2" log data record 630. Additionally, as shown, a "level 2" log data record 630 may include a data component "Count" field 672 based on the aggregated log data records. Because fewer of the data components are compared in the aggregation process, the total of number of unique "level 2" indexed log data records may be less than that of unique "level 1" log data records. Additionally, a "level 3" indexing and aggregation may be performed on the "SC status code" field 602 and the "Remote IP" field 652. As shown, "level 3" log data record 640 may also include a data component "Count" field 674 based on the aggregated log data records. The total number of unique "level 3" indexed log data records (640) may be less still than the total number of "level 2" indexed log data records. As fewer data components are indexed and aggregated, the total number of stored records will decrease. Thus, the number of data components indexed and aggregated for any one "level" may be selected based on achieved efficiencies. Additional details of the exemplary "level 2" and "level 3" data components are discussed with respect to FIGS. 8 and 9, respectively.

As shown in FIG. 8, the "level 2" indexed data components may include a subset of the "level 1" data components similarly discussed with respect to FIG. 7. For example, as shown, the "Remote IP" field 652, "Host" field 656 and "CS HTTP method" field 658 may include the same data component fields indexed in "level 1" log data record 620. The additional data component "Count" field 672, however, is based on the "level 2" aggregation and may, thus include a different value from "Count" field 670. In some embodiments, the "level 3" indexed data components may include a subset of the "level 2" indexed data components, however, as shown with respect to FIGS. 6 and 9, in some embodiments, the "level 3" indexed data components may also include other data component fields, such as "SC status code" field 662 which may indicate an HTTP status code of the communications request. Thus, in some embodiments, the data components indexed and aggregated in upper "levels" need not be subsets of one or more lower levels of indexed data components.

Thus, according to some embodiments, a "level 3" (and "level 2") aggregation may be performed on "level 0" log data records, thus including data components not indexed in a "level 1" or "level 2" log data record. And, in another embodiment, the higher level aggregations may be performed based on subsets of data components of a "level 1" or "level 2" log data records. Accordingly, the various levels of aggregation may be performed independently of other levels of aggregation or may be based on the other levels of aggregation.

In some embodiments, an exemplary method may include performing the additional levels of aggregation based on a passage of time. According to one exemplary embodiment, proxy server log data may be indexed according to a "level 0" index level, and the generated "level 0" indexed log data records may be stored in log records storage system 240 for a predetermined period of time (e.g., one week, one month, three months, or longer). Thus, at the end of the predetermined time period from the date of generation, index system 140 may remove the "level 0" log data records that are older than the predetermined period. Instead of losing the historical log data records after the predetermined period, however, an exemplary embodiment may perform a "level 1" aggregation on the "level 0" log data records. Thus, in an exemplary embodiment, certain historical information of the original "level 0" log data records may be maintained. By replacing the "level 0" log data records with selectively indexed "level 1" log data records, the exemplary embodiments and systems can maintain analytical capabilities of the system without the required storage space requirements. And further still, after a second predetermined time period, the "level 1" log data records may be aggregated according to a "level 2" aggregation, and the "level 2" log data records aggregated according to a "level 3" aggregation.

In this way, over time, the number of log data records for a particular logging period may be reduced through serial aggregation. This may reduce data storage requirements, yet still maintain valuable information for the historical set of proxy server log data. For example, in some embodiments, "level 0" log data records may be maintained for three months, "level 1" log data records may be maintained for six months, "level 2" log data records may be maintained for one year, and "level 3" log data records may be maintained indefinitely.

Any combination of the above-described levels of indexing log data records may be combined for any given period of time. Additionally, any of the above-described levels of indexing log data may be performed over extended logging periods, thus providing aggregation on top of aggregation. For example, in some embodiments, index system 140 may maintain a plurality of "level 1" indexed log data records for a logging period of each day in a given period of time. Additionally, index system 140 may perform a "level 1" aggregation over "level 1" log data records for an extended logging period of one month, for example. Thus, in some embodiments, index system 140 may include a plurality of "level 1" log data records for each of a plurality of days, as well as a plurality of "level 1" log data records corresponding to a single month of proxy server log data.

Additionally, in some embodiments, for any given logging period, the received proxy server log data may be stored by index system 140 as "level 0" indexed log data records, "level 1" indexed log data records and even "level 2" or "level 3" indexed log data records. Maintaining multiple levels of log data for the same logging period or for overlapping logging periods may enhance the speed of providing certain analytical results based on the indexed proxy server log data. Many other combinations and permutations of indexing and aggregating log data records over one or more logging periods may be implemented as contemplated by the present disclosure.

Some additional indexing and aggregation methods may be realized by identifying particular analytical results desired from the received proxy server log data. Thus, depending on the particular questions an enterprise may seek concerning its network's traffic, index system 140 may perform any one or more combinations of the above described indexing and aggregation operations over multiple logging periods or over multiple data sets.

The disclosed indexing and aggregation methods may also be implemented or accessed by an alert function to screen for certain potentially malicious behavior. For example, in some embodiments, index system 140 may determine, based on an aggregation data component in a summarized record, whether certain thresholds may have been met or exceeded. In some embodiments, a threshold may correspond to the number of bytes a particular user transfers out to any domain, or a particular domain, or the number of bytes transferred to a particular domain over all users. Thus, in some embodiments, aggregation may be based on a client IP address and a remote IP address and the aggregation data may correspond to the total number of bytes sent. Index system 140 may then generate an alert if the total number of bytes sent exceeds some threshold. The threshold may be predetermined or it may be dynamically set based on a number of variable factors related to suspicious or normal behavior. Any other number of data components may be indexed according to a desired query.

Figure 10:
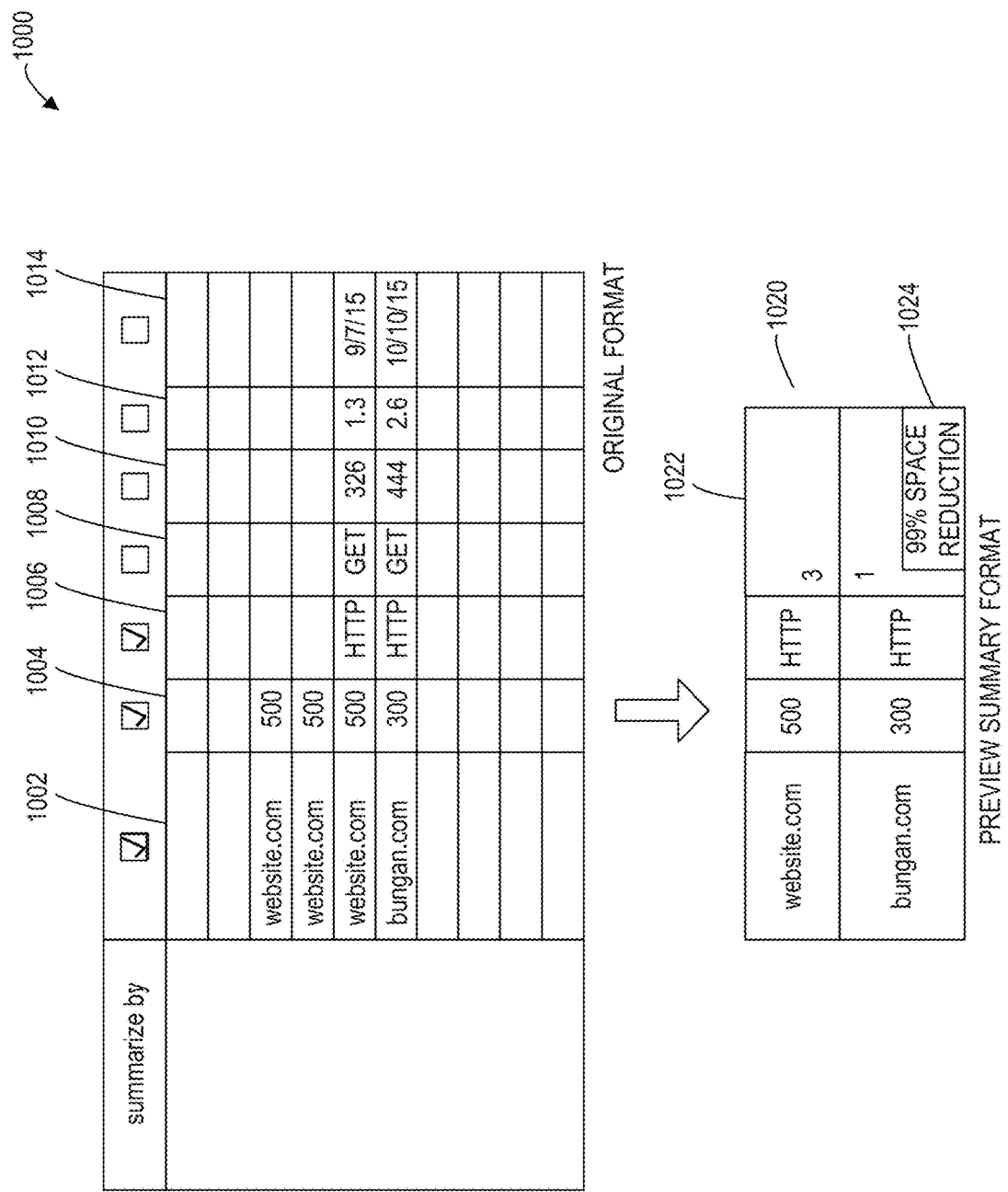
FIG. 10 is an illustration of an exemplary interface, consistent with embodiments of the present disclosure.
Figure 11:
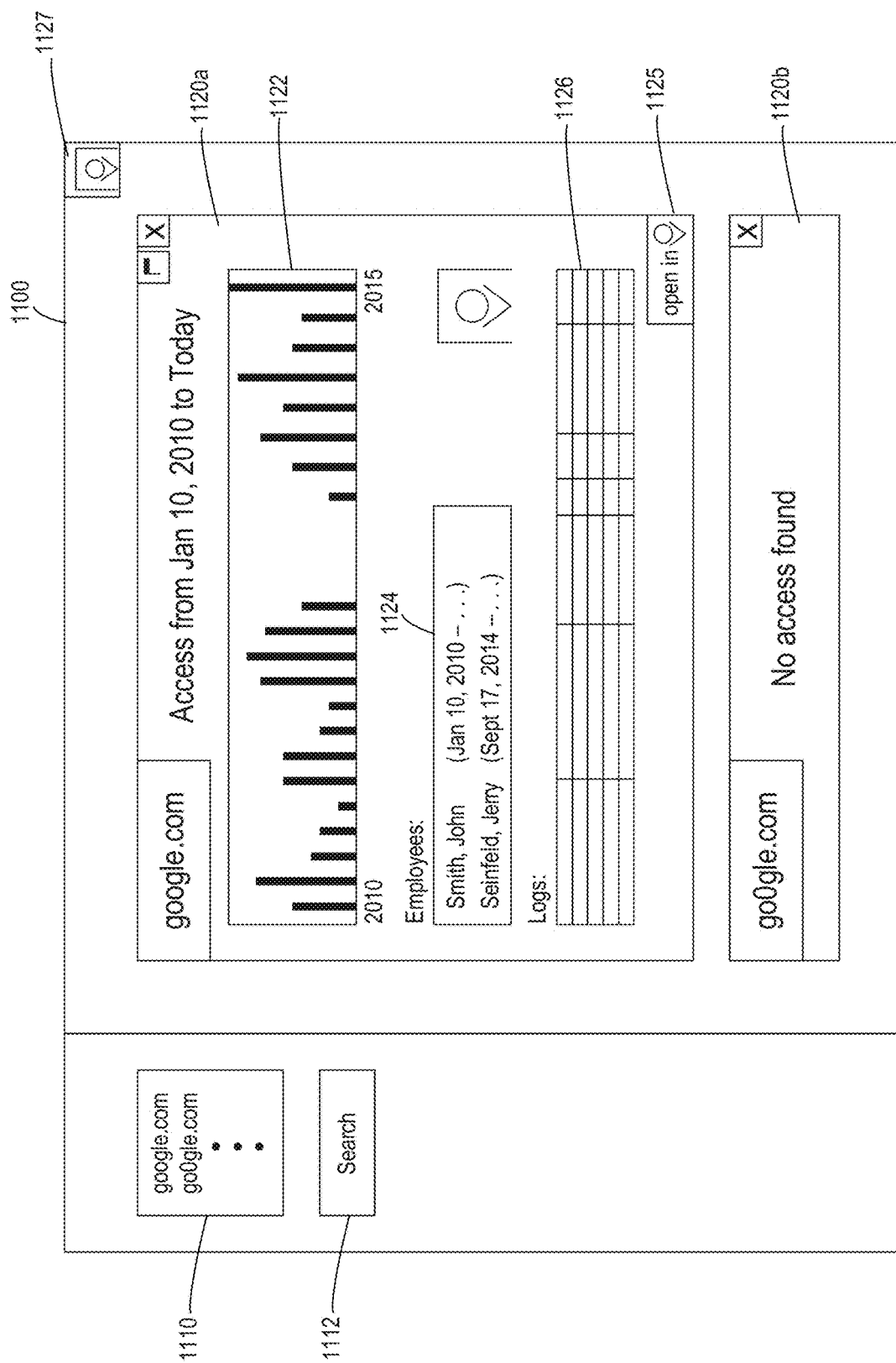
FIG. 11 is an illustration of another exemplary interface, consistent with embodiments of the present disclosure.

According to some embodiments, search module 234 and analysis module 236 may be configured to provide certain analytical results that may be displayed with a user interface generated by a user interface module 232. FIGS. 10 and 11 provide example interfaces and analytical capabilities according to the disclosed embodiments.

As shown in FIG. 10, according to one exemplary embodiment, an interface 1000 may be provided according to user interface module 232 to display a plurality of log data records in original format or "level 0" index level. Interface 1000 is exemplary only and simplified for clarity. An exemplary interface 1000 may include a display in table format of a sample of "level 0" log data records according to the above disclosure. Exemplary interface 1000 may enable a user to selectively index and aggregate the "level 0" log data records according to any of the indexed data components. In the example shown, the "level 0" log data records may be displayed in a table format and may include a plurality of rows corresponding to individual log data records and a plurality of columns corresponding to indexed data components. In the embodiment shown, the plurality of columns may include a domain 1002, HTTP status 1004, protocol 1006, HTTP request type 1008, number of bytes received 110, number of bytes sent 1012, and request date 1014.

According to some embodiments, a user may be able to select one or more of the indexed data components to generate aggregated and summarized data. For example, as shown, a check box associated with each column, for example, may be selected to identify one or more data components for performing an aggregation as described above with respect to operation 430 shown in FIG. 4. In this example, a user has selected columns 1002, 1004, and 1006 for aggregation. According to some embodiments, an exemplary interface may be able to dynamically generate a preview 1020, as shown, illustrating a summarized log record based on the selected components. As shown, the summarized log record preview 1020 may include a summary of the unique log data records based on the selected data components. The summarized log record 1020 may include the information corresponding to the matching/ corresponding data components, as well as an additional indicator 1022 corresponding to the number of aggregated data records with the matching data components. According to an exemplary embodiment, preview 1020 may include an additional window 1024 identifying an achieved space reduction based on the selected data components.

According to the embodiment shown in FIG. 11, interface 1000 may be implemented to generate a script for processing the underlying log data records according to the exemplary embodiments. By selecting certain ones of the data components for processing, aggregator module 238, for example, may be configured to automatically process and aggregate log data records according to the selected indexing criteria.

FIG. 11 illustrates an exemplary interface 1100 for generating analytical results based on a search of indexed and aggregated log data records according to the exemplary embodiments. Interface 1100 may include a plurality of windows or display fields providing various displayed results or selectable functionality. For example, a first window 1110 provides a search input window to enable a user to enter one or more search criteria over the plurality of stored log data records. In the embodiment shown, a user has selected to display results for domains "google.com" and "goOgle.com." In this example, "goOgle.com" may represent a malicious domain that the system is interested in tracking to determine the extent of interaction the network has had with such a domain. A user may be enabled to generate a search result by selecting search button 1112. Search results may be generated in real time and output as shown. For example, a first display 1120a may be generated corresponding to the search results for "google.com." First display 1120a may include a plurality of subsequent windows for generating particular results based on the search. For example, window 1122 may display historical results over a desired time period, from 2010 to 2015 for example in the form of a histogram or other chart. The histogram shown may be interactive to further refine search results or change the display of the one or more plurality of windows. Another window 1124 may display a subset of information corresponding to the search query. For example, a subset of the employees with the greatest number of total bytes received from the searched domain may be displayed in an ordered list.

Another window 1126 may be provided illustrating summarized log data records stored in index system 140 according to the search results. The search results may be investigated further by selecting a button 1125 to open subsequent more detailed displays of sets of data for investigation. Window 1120b may be provided to display that no search results were found for the selected query of "goOgle.com." Another button 1127 may be provided, for example, to generate a display identifying other sets of data accessible for investigation.

The illustrated interfaces including various windows and selectable buttons are provided by way of example to illustrate certain capabilities of index system 140. Many other similar configurations are contemplated for providing the features and capabilities described above.

As indicated above, the particular embodiments directed to proxy server data are exemplary only. Other embodiments may be implemented using the above described methods and techniques on any type of data record. For example, in some embodiments, the plurality of indexed and aggregated data records may include a plurality of data records regarding firewall log data, or any other network traffic data. An embodiment for aggregating data records of firewall log data may be implemented similar to the proxy server log embodiments disclosed above. For example, indexed firewall log data may be indexed based on a data component corresponding to each unique outside host. In this example, a summarized data record may be generated for each outside host and may include an additional data component corresponding to a total number of communication events or a total number of bytes received/transmitted, for example.

Additionally, in another embodiment, a plurality of data records corresponding to e-mail metadata may also be indexed and aggregated according to the methods disclosed above. For example, a plurality of data records of e-mail metadata may each include a number of data components related to a sender identification, recipient identification, subject keyword, attachment type, attachment keyword, attachment size, and any number of other indicia. According to the disclosed embodiments, the plurality of data records may correspond to a plurality of e-mail messages entering or leaving the network, or generated and received by users of a network. The plurality of data records may also be grouped or categorized according to any other criteria—such as a category based on employees within a business unit of an enterprise, for example.

In some embodiments, the plurality of e-mail metadata data records may be indexed according to any set or subset of the data components, and aggregated using the above methods. In some embodiments, one or more of the indexed data components may be selected for performing an aggregation on. The plurality of indexed data records may then be aggregated based on matching data components of the selected indexed data components. Thus, according to the disclosed methods, e-mail metadata data records with certain matching data components may be aggregated into a plurality of summarized data records. In one example, aggregation may be performed for a user or an association of users based on an e-mail recipient. Thus, for example, e-mail metadata data records may be aggregated based on a recipient address forming a plurality of summarized data records, one for each unique recipient. Similar to the disclosed embodiments, aggregation may be performed instantaneously or over a period of time. Additionally, similar to the above, the summarized data records may include one or more additional data components based on the aggregated data records. For example, an additional data component may identify the total number of data records aggregated in the summarized record, or it may correspond to the total size of attachments associated with the aggregated data records. Similar to the above embodiments, the indexing and aggregation methods can significantly reduce the total number of e-mail data records stored, while maintaining historical significance of the stored e-mail metadata.

In yet another embodiment, a plurality of data records to be indexed and aggregated according to the disclosed methods may include data records corresponding to any information system or data source. The disclosed systems and methods may be used for any system in which the occurrence of an event or a communication provides useful information apart from the details of the event or communication. For example, in one embodiment, the plurality of data records may correspond to transaction data including a plurality of data components such as a payor identifier, a payee identifier, a goods or services identifier, a location, and transaction amount, among others. The disclosed systems and methods may be used to aggregate the plurality of transaction data records based on a particular payor and a payee to generate a summarized data record including a total number of transaction records or a total transaction amount. In another embodiment, access records associated with a swipe or entry for one or more secure buildings or points of entry may be aggregated to summarize the total number of swipes for a user at one or more points of entry in a given day or other arbitrary time period. Numerous other examples for aggregating events are also contemplated by the present disclosure.

In another embodiment, a plurality of data records to be indexed and aggregated according to the disclosed methods may include data records corresponding to Active Directory login logs. Instead of storing a log line for each of the numerous Active Directory login types for each login event for every user of a system, the disclosed systems and methods may aggregate a plurality of log records based on a type of the login event. Thus, in accordance with the disclosed systems and methods, aggregation may be performed on a plurality of indexed log records associated with a user based on a type of login to a particular system. In systems accessible to large numbers of users, the total number of login logs can be significantly reduced by aggregating logins of similar type for each user of the system. As an example, when user 'A' has 14 type 'X' logins in a day and 12 type 'Y' logins, the disclosed systems and methods may maintain only two summarized data records, one for each type instead of the 26 total, and each summarized data record may include an aggregated data component corresponding to the total number of logins for that type.

Embodiments of the present disclosure have been described herein with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only, with a true scope and spirit of the present disclosure being indicated by the following claims. It is also intended that the sequence of steps shown in figures are only for illustrative purposes and are not intended to be limited to any particular sequence of steps. As such, it is appreciated that these steps can be performed in a different order while implementing the exemplary methods or processes disclosed herein.

What is claimed is:

1. A system comprising:
one or more memory devices configured to store program instructions; and
one or more processors configured to execute the program instructions to:
access a plurality of data records comprising a plurality of data values;
generate an interactive user interface including:
a listing of the plurality of data records, and
one or more selectable columns associated with the data values of the plurality of data records;
receive user input selecting at least a first selectable column of the one or more selectable columns;
identify those of the plurality of data records having matching data values within the first selectable column;
determine measures of the identified data records, wherein the measures of the identified data records are based on aggregations of the identified data records;
update the interactive user interface to include a summarized data record table indicating the matching data values and the measures of the identified data records; and
generate, for storage, a summarized data record including the aggregations of the identified data records.

2. The system of claim 1, wherein the updated interactive user interface further includes an indication of a space reduction achieved by the summarized data record table.

3. The system of claim 1, wherein the summarized data record table does not include at least some non-matching data values of the identified data records.

4. The system of claim 1, wherein the summarized data record table includes rows associated with each of the matching data values.

5. The system of claim 1, wherein:
the summarized data record table does not include at least some non-matching data values of the identified data records, and
the summarized data record table includes rows associated with each of the matching data values.

6. The system of claim 5, wherein the updated interactive user interface further includes an indication of a space reduction achieved by the summarized data record table.

7. The system of claim 1, wherein the data values include one or more of a domain, an HTTP status, a protocol, an HTTP request type, a number of bytes received, a number of bytes sent, or a request date.

8. The system of claim 1, wherein the measures of the identified data records corresponds to a number of aggregated data records having the matching data values.

9. A computer-implemented method comprising:
accessing a plurality of data records comprising a plurality of data values;
generating an interactive user interface including:
a listing of the plurality of data records, and
one or more selectable columns associated with the data values of the plurality of data records;
receiving user input selecting at least a first selectable column of the one or more selectable columns;
identifying those of the plurality of data records having matching data values within the first selectable column;
determining measures of the identified data records, wherein the measures of the identified data records are based on aggregations of the identified data records;
updating the interactive user interface to include a summarized data record table indicating the matching data values and the measures of the identified data records; and
generating, for storage, a summarized data record including the aggregations of the identified data records.

10. The computer-implemented method of claim 9, wherein the updated interactive user interface further includes an indication of a space reduction achieved by the summarized data record table.

11. The computer-implemented method of claim 9, wherein the summarized data record table does not include at least some non-matching data values of the identified data records.

12. The computer-implemented method of claim 9, wherein the summarized data record table includes rows associated with each of the matching data values.

13. The computer-implemented method of claim 9, wherein:
the summarized data record table does not include at least some non-matching data values of the identified data records, and
the summarized data record table includes rows associated with each of the matching data values.

14. The computer-implemented method of claim 13, wherein the updated interactive user interface further includes an indication of a space reduction achieved by the summarized data record table.

15. A non-transitory computer-readable medium storing a set of instructions that are executable by one or more processors to cause a computing system to:
    access a plurality of data records comprising a plurality of data values;
    generate an interactive user interface including:
        a listing of the plurality of data records, and
        one or more selectable columns associated with the data values of the plurality of data records;
    receive user input selecting at least a first selectable column of the one or more selectable columns;
    identify those of the plurality of data records having matching data values within the first selectable column;
    determine measures of the identified data records, wherein the measures of the identified data records are based on aggregations of the identified data records;
    update the interactive user interface to include a summarized data record table indicating the matching data values and the measures of the identified data records; and
    generate, for storage, a summarized data record including the aggregations of the identified data records.

16. The non-transitory computer-readable medium of claim 15, wherein the updated interactive user interface further includes an indication of a space reduction achieved by the summarized data record table.

17. The non-transitory computer-readable medium of claim 15, wherein the summarized data record table does not include at least some non-matching data values of the identified data records.

18. The non-transitory computer-readable medium of claim 15, wherein the summarized data record table includes rows associated with each of the matching data values.

19. The non-transitory computer-readable medium of claim 15, wherein:
    the summarized data record table includes rows associated with each of the matching data values,
    the summarized data record table does not include at least some non-matching data values of the identified data records, and
    the summarized data record table includes rows associated with each of the matching data values.

* * * * *